United States Patent
Jarvis

(10) Patent No.: US 11,285,537 B2
(45) Date of Patent: Mar. 29, 2022

(54) METHOD FOR MANUFACTURING A METAL BASED FRAME, AND A METAL BASED FRAME

(71) Applicant: HIPtec AS, Oslo (NO)

(72) Inventor: David Jarvis, Oslo (NO)

(73) Assignee: HIPtec AS, Oslo (NO)

(*) Notice: Subject to any disclaimer, the term of this patent is extended or adjusted under 35 U.S.C. 154(b) by 0 days.

(21) Appl. No.: 16/765,305

(22) PCT Filed: Nov. 20, 2018

(86) PCT No.: PCT/EP2018/081955
§ 371 (c)(1),
(2) Date: May 19, 2020

(87) PCT Pub. No.: WO2019/097088
PCT Pub. Date: May 23, 2019

(65) Prior Publication Data
US 2020/0282462 A1    Sep. 10, 2020

(30) Foreign Application Priority Data

Nov. 20, 2017 (EP) .................................. 17202580

(51) Int. Cl.
*B32B 15/01*    (2006.01)
*B22F 3/15*    (2006.01)
(Continued)

(52) U.S. Cl.
CPC ............... *B22F 3/15* (2013.01); *B21J 5/002* (2013.01); *B22F 7/062* (2013.01); *B23K 20/021* (2013.01);
(Continued)

(58) Field of Classification Search
None
See application file for complete search history.

(56) References Cited

U.S. PATENT DOCUMENTS

| 3,531,848 A | 10/1970 | Gripshover et al. |
| 2006/0261135 A1 | 11/2006 | Midgett |

FOREIGN PATENT DOCUMENTS

| GB | 2419835 | 5/2006 |
| GB | 2419835 A | 5/2006 |

(Continued)

OTHER PUBLICATIONS

PCT International Search Report and Written Opinion for PCT/EP2018/081955 filed Nov. 20, 2018 which is the parent application to the instant application dated Dec. 18, 2018, 16 pages.

(Continued)

*Primary Examiner* — Adam Krupicka
(74) *Attorney, Agent, or Firm* — Harness, Dickey & Pierce, P.L.C.; Anthony Fussner

(57) ABSTRACT

The inventive concept relates to a method for manufacturing a metal based frame comprising the steps of: providing a first element (202) comprising a first element inner enveloping wall (204) surrounding an interior volume; providing a second element (210) having a second element outer wall (212), a second element inner wall (213), and a third element (220) having a third element outer wall (222), a third element inner wall, wherein the second element inner wall (213) and the third element inner wall each surrounds a free space (215); arranging the second element (210) and the third element (220) in the interior volume (208) such that an intermediate space (230) having an access opening (232) is formed between the first element inner enveloping wall (204) and the second element outer wall (212) and the third element outer wall (222) in a predetermined pattern; arranging a plurality of pieces of a wrought material (250) in the intermediate space (230); providing a closing member (240) arranged such that it covers at least the access opening (232) of the intermediate space (230), whereby the first element (202), the second element (210), the third element (220), the (Continued)

plurality of pieces of a wrought material (250), and the closing member (240) form an assembled frame arrangement (200); removing gas from the intermediate space; subjecting the assembled frame arrangement to a hot pressing process for a predetermined time at a predetermined pressure and a predetermined temperature such that at least the plurality of pieces of a wrought material bond metallurgically to each other, to form the metal based frame.

8 Claims, 7 Drawing Sheets

(51) Int. Cl.
    *B21J 5/00*         (2006.01)
    *B22F 7/06*         (2006.01)
    *B23K 20/02*       (2006.01)

(52) U.S. Cl.
    CPC ........ *B32B 15/01* (2013.01); *B22F 2003/153* (2013.01)

(56) References Cited

FOREIGN PATENT DOCUMENTS

| WO | WO8705241 | 9/1987 |
| WO | WO-8705241 A1 | 9/1987 |

OTHER PUBLICATIONS

International Preliminary Report for PCT/EP2018/081955 filed Nov. 20, 2018 which is the parent application to the instant application, dated Oct. 24, 2019, 21 pages.

METHOD FOR MANUFACTURING A METAL BASED FRAME, AND A METAL BASED FRAME

This patent application is a U.S. national stage filing under 35 U.S.C. § 371 of PCT International Application No. PCT/EP2018/081955 filed Nov. 20, 2018 (published as WO2019/097088 on May 23, 2019), which claims priority to and the benefit of European Application No. 17202580.1 filed Nov. 20, 2017. The entire contents of these applications are incorporated herein by reference.

TECHNICAL FIELD OF THE INVENTION

The present invention relates to a method for manufacturing a metal based frame, and to a metal based frame.

BACKGROUND OF THE INVENTION

Frames, or frame structures, such as metal based frames, are used widely in various industries for structural applications, such e.g. for transport and in constructions or buildings. A frame structure typically comprises a metal member for enabling a strong and resistant structure, and a plurality of cavities in between different portions of the metal member in order to keep the weight low, or relatively low compared to a solid construction.

Current manufacturing technologies of frame structures or frame components are based on e.g. machining-from-solid such as e.g. milling of a forged billet, welding different sub-components together to form the frame structure, or more recently, additive manufacturing in which the frame structure or frame component is 3D-printed on a substrate.

There are various problems with the used manufacturing technologies. For the machining-from-solid manufacturing, subtractive removal of material is needed, making it costly and wasteful, which is especially aggravating when expensive materials like titanium or nickel are used. Moreover, for the welding manufacturing technology, problems and impairments may be introduced into the frame structure due to the nature of welding, e.g. in the form of cracks, high porosity, distortion and residual stresses, etc. Thus, the formed frame structure may be fragile and/or in need of costly non-destructive testing of the frame structure. Finally, for additive manufacturing, the produced frame structure is in principle manufactured as an all-weld-solidified structure, which is typically associated with high residual stresses, leading to a risk of bending and cracking between frame structure and the substrate.

Therefore, there is a need to improve the current state of the art in order to overcome the above mentioned problem as well as other problems.

SUMMARY OF THE INVENTION

An object of the present inventive concept is to provide an improved method for manufacturing a metal based frame, which at least partly alleviates the above mentioned drawbacks. This and other objects, which will become apparent in the following, are accomplished by a method for manufacturing a metal based frame, and a metal based frame, as defined in the accompanying claims.

The present inventive concept is based on the insight that a strong metal based frame can be manufactured in an effective manner by creating an intermediate space in a predefined pattern between walls, or wall portions, of different elements (or between different surfaces of the different elements), which intermediate space can be filled with a wrought material, sealed, and subsequently be subject to a hot pressing process for a predetermined time at a predetermined pressure and a predetermined temperature. Stated differently, by providing different elements comprising a respective wall or wall portion, and arranging the different elements in relation to each other such that an intermediate space is formed in a predetermined pattern between the walls, or wall portions, or surfaces of the different elements, and subsequently filling the intermediate space with wrought material, sealing the intermediate space including said wrought material, and subsequently letting the wrought material in the intermediate space undergo a hot pressing process, a strong metal based frame can be manufacture in an effective manner.

According to a first aspect of the present inventive concept, a method for manufacturing a metal based frame is provided. The method comprises the steps of providing a first element comprising a first element inner enveloping wall surrounding an interior volume, said interior volume being at least partly defined by said first element inner enveloping wall;

providing a second element having a second element outer wall, a second element inner wall, and a third element having a third element outer wall, a third element inner wall; wherein each of the second element inner wall and third element inner wall each surround a free space;

arranging said second element and said third element at least partly in said interior volume such that an intermediate space having an access opening is formed between said first element inner enveloping wall and said second element outer wall and said third element outer wall in a predetermined pattern;

arranging a plurality of pieces of a wrought material in said intermediate space;

providing a closing member arranged such that it covers said access opening of said intermediate space, said closing member being sealingly connected to at least said first element, whereby said first element, said second element, said third element, said plurality of pieces of a wrought material, and said closing member form an assembled frame arrangement;

removing gas from said intermediate space;

subjecting said assembled frame arrangement to a hot pressing process, e.g. a hot isostatic pressing process, for a predetermined time at a predetermined pressure and a predetermined temperature, such that at least said plurality of pieces of a wrought material bond metallurgically to each other, to form said metal based frame.

Hereby, a strong metal based frame with a high density and with relatively low residual stresses can be manufactured in an effective manner. Moreover, no, or very little subtractive removal of material is needed. Furthermore, by the manufacturing method of the metal based frame according to the inventive concept, complex structures of the metal based frame can be made more easily. The metal based frame may e.g. be referred to as a metal based frame for constructions or buildings, or a metal based frame for transports.

According to at least one example embodiment, the hot pressing process is a hot isostatic pressing process, also known as a HIPping process, which is particularly suitable for the manufacturing of the metal based frame. The HIPping process typically involves subjecting a component, in this case the assembled frame arrangement, to both an elevated temperature and an isostatic gas pressure in a high pressure containment vessel, using for example argon as pressurizing gas. By using HIPping for manufacturing the metal based frame the porosity in the structure of the metal based frame can be further reduced and the density of the structure further increased. Thus, an advantage using HIPping is that the metal based frame after the HIPping process step has a near-net shape, i.e. the shape of the manufactured metal based frame after the HIPping process step is the same, or almost, or sufficiently the same as the desired shape of the final metal based frame. Hence, post-treatment of the metal based frame related to re-shaping can be omitted or at least reduced compared to prior art methods. Moreover, and according to at least one example embodiment of the invention, during the HIPping process, portions or parts of the assembled frame arrangement are subjected to some lateral shearing. The lateral shearing may act as a surface treatment and remove any residual oxidation layers, or dirt, and thereby ensure a good metallurgical bonding.

According to at least one example embodiment, the hot pressing process involves subjecting the assembled frame arrangement to a uniaxial pressure, e.g. by using a hot pressing equipment and the simultaneous application of heat and pressure. Thus, the plurality of pieces of a wrought material bond metallurgically to each other at a temperature high enough to induce sintering and creep processes.

It should be noted that for e.g. HIPping, traditionally a can or canister, such as a HIPping can, or a HIPping canister, is filled with a metal powder, prior to subjecting the powder-filled can to the hot pressing. Thus, the metal based component is formed corresponding to what has been previously described, i.e. the powder is hot pressed for a predetermined time at a predetermined pressure and a predetermined temperature, and is thus consolidated to the metal based component. By using a wrought material, the drawbacks of using e.g. powder as a starting material for the manufacturing method, such as e.g. low packing density and the resulting shape change of the final product, are overcome or at least reduced. Hence, the method according to the invention may be described as a metal powder-free hot pressing (or HIPping) manufacturing method.

It should be understood that by arranging said second element and said third element such that an intermediate space is formed between said first element inner enveloping wall (or an inner surface of said first element) and said second element outer wall (or an outer surface of said second element) and said third element outer wall (or an outer surface of said third element) in a predetermined pattern, said intermediate space is typically opened to at least a first side of the intermediate space, i.e. by said access opening. According to at least one example embodiment, the intermediate space is opened to only said first side of the intermediate space, i.e. said access opening is a single access opening to the intermediate space. That is, the access opening of the intermediate space may be described as at least partly limiting said intermediate space. According to at least one example embodiment, the intermediate space is further limited by the first element inner enveloping wall, the second element outer wall and the third element outer wall. Described differently, the first element, the second element and the third element may be arranged and configured such that said intermediate space has a single access opening, or an access opening facing in only one direction. According to at least one example embodiment, at least one of the first element, the second element and the third element comprises a lateral wall portion, and a bottom wall portion arranged perpendicular to said lateral wall portion, wherein said bottom wall portion limits said intermediate space, such embodiments are further described below.

It should further be noted, that by providing a second element having a second element outer wall, a second element inner wall, and a third element having a third element outer wall, a third element inner wall; wherein the second element inner wall and third element inner wall each surround a free space, cavities can be formed in the metal based frame. The provision of cavities in the metal based frame is advantageous in that it reduces the weight of the metal based frame compared to the weight of solid constructions. Herein, the term "free space" denotes a void or cavity, separated from the intermediate space by the second element inner walls and, if present, third element inner walls. That the second and third element inner walls surround a free space is furthermore advantageous in that it reduces the weight of the assembled frame arrangement.

According to at least one example embodiment, the ratio, by volume, of free space:intermediate space is at least 3. That is, the volume of the free space is at least 3 times the volume of the intermediate space. This means that the metal based frame will comprises more, by volume, of cavities than of metal. In some example embodiments, the ratio, by volume, of free space:intermediate space is at least, such as at least 3.5, preferably at least 4, more preferably at least 5. In some examples, the ratio, by volume, of free space:intermediate space is in the range of 1:3-10, such as in the range of 1:3-7, preferably 1:3-6. Thus, the method disclosed herein can efficiently be used to manufacture frames where the weight is low, or relatively low compared to a solid construction having the same surface area and/or the same outer volume and/or the same total envelope volume. The total envelope volume is defined as the volume formed by the first element inner enveloping walls.

The volume of free space is in the assembled frame arrangement is the volume of the volume of the free space surrounded by the second element inner walls and the volume of the free space surrounded by the third element inner walls.

In the frame the volume of metal may correspond to the intermediate volume of the assembled frame assembly. The volume of the cavities may correspond to the volume of the free space in the assembled frame assembly.

Herein, the term "surround" denotes that the inner walls of the second and third element at least partially enclose a free space. Each inner wall may have four sides that enclose the free space.

According to at least one example embodiment, the step of arranging a plurality of pieces of a wrought material in said intermediate space, may comprise introducing the plurality of pieces of a wrought material to said intermediate space via said access opening. According to at least one example embodiment, the intermediate space is filled, or almost filled, such as e.g. filled to at least 70% or at least 80% or at least 90% or at least 95% or at least 99%, with pieces of a wrought material, e.g. corresponding to said plurality of pieces of a wrought material. According to at least one example embodiment, at least a sub-set of such pieces of a wrought material bond metallurgically to each other during the hot pressing process.

According to at least one example embodiment, the step of providing a closing member arranged such that it covers said access opening of said intermediate space, wherein said closing member is sealingly connected to at least said first element, may be comprised of the steps of arranging the closing member to cover said access opening, and sealingly connect said closing member to at least said first element, such as e.g. to a portion of said first element inner enveloping wall. Hereby, the intermediate space is sealed from the surroundings, possibly with the exception of a gas evacuating aperture fluidly connected to said intermediate space, in order to prepare evacuation of, or gas removal from, said intermediate space.

The term "sealingly connected" may be interpreted as connecting such that a seal is formed, or by being connected such as different portions of the same single piece unit. For example, by stating that the closing member is sealingly connected to at least the first element, the closing member is connected to the first element by a seal, such as e.g. a weld by welding. The sealing may e.g. be done by welding, vacuum brazing, metal brazing, MIG welding, TIG welding, electron beam welding and/or thermitic welding.

According to at least one example embodiment, the closing member is sealingly connected to at least the first element and at least one of the second and third elements. According to at least one example embodiment, the closing member is sealingly connected to the first, second and third elements.

It should be noted that, typically, not only the plurality of pieces of a wrought material bond metallurgically to each other during said hot pressing process (or HIPping process), but also that the said first element, said second element, said third element, and/or said closing member bond metallurgically to each other, or to said pieces of a wrought material.

According to at least one example embodiment, said an assembled frame arrangement comprises said first element, said interior volume, said second element, said third element, said intermediate space in a predetermined pattern, said plurality of pieces of a wrought material and said closing member. The assembled frame arrangement may be referred to as a pre-hot pressing (or pre-HIPping) arrangement. The assembled frame arrangement is thus to be understood as an arrangement being prepared for being subjected or exposed to said hot pressing process. For example, the step of removing gas from said intermediate space, may be carried out to said assembled frame arrangement. It should be understood that the step of subjecting said assembled frame arrangement to a hot pressing process comprises the step of subjecting at least said plurality of pieces of a wrought material to a hot pressing process for a predetermined time at a predetermined pressure and a predetermined temperature, such that said plurality of pieces of a wrought material bond metallurgically to each other.

According to at least one example embodiment, said metal based frame is formed such that it comprises said plurality of pieces of a wrought material which has been bonded metallurgically to each other during the hot pressing process, and at least one of said first element, said second element, said third element, and said closing member. Hence, at least one of said first element, said second element, said third element, and said closing member has been metallurgically bonded to at least one of said plurality of pieces of a wrought material, and optionally to at least one other of said first element, said second element, said third element, and said closing member during the hot pressing process. Thus, according to such embodiments, at least one of said first element, said second element, said third element, and said closing member is metal based. In other words, depending on the choice of material, the first element, the second element, the third element and the closing member may bond metallurgically to each other, and/or to the pieces of a wrought material.

According to at least one example embodiment, said metal based frame comprises said plurality of pieces of a wrought material, said first element, said second element, said third element, and said closing member which have been bonded metallurgically to each other during the hot pressing process.

According to at least one example embodiment, said metallurgically bonded plurality of pieces of a wrought material form at least a portion of said metal based frame.

According to at least one example embodiment, said metal based frame is a single unit metal based frame.

It should be understood that said predetermined pattern of said intermediate space is predetermined in relation to the shape of, at least a part of, the metal based frame. That is, depending on the desired shape and form of the metal based frame, the second element and the third element are arranged in said interior volume in such a way that the intermediate space thereby is formed to correspond to the desired shape of, at least a part of, the metal based frame. It should be noted that the metal based frame may comprise more than the metallurgically bonded pieces of a wrought material, which have been arranged in the intermediate space, and for example, also comprise at least portions of, such as e.g. the walls or wall portions of, the first, second and/or third element. Thus, the predetermined pattern of the intermediate space, and the resulting shape of the metallurgically bonded pieces of a wrought material, may form at least a portion of the metal based frame, such as e.g. a core portion of the metal based frame. Hence, the predetermined pattern of the intermediate space may be referred to as a frame pattern, or a core frame pattern.

The formed metal based frame may e.g. have an extension in at least one direction of at least 0.05 m, such as e.g. at least 0.1 m. Additionality, or alternatively, the formed metal based frame may have an extension in at least another direction of at least 0.5 m, such as e.g. at least 1 m, such as e.g. at least 2 m. The metal based frame may e.g. be at least 0.1 m×0.1 m×2 m.

According to at least one example embodiment, said method further comprises the step of:

removing at least a portion of one of said first element, said second element, said third element, and said closing member.

In other words, at least a portion of the metal based frame corresponding to said first element, said second element, said third element, and said closing member prior to that the assembled frame arrangement has been subject to a hot pressing process, may be removed. Hereby, the metal based frame may be reshaped, or reduced in size and/or undesired portions of the metal based frame may be removed.

For example embodiments in which the metal based frame, which is formed by the hot pressing process of the assembled frame arrangement, comprises all of, or at least one of, said first element, said second element, said third element, and said closing member (i.e. all of, or at least one of, said first element, said second element, said third element, and said closing member has metallurgically bonded to at least one of said plurality of pieces of a wrought material and/or to another one of said first element, said second element, said third element, and said closing member), the metal based frame may be reshaped, or reduced in size by removing at least a portion of the metal based frame corresponding to one of said first element, said second element, said third element, and said closing member.

Said removing may e.g. be performed by physically removing said portion, e.g. by cutting or machining away said portion. Said removing may alternatively be performed by chemical means, i.e. said portion may be removed chemically by e.g. subjecting (e.g. dipping) the metal based frame to an acid etching away said portion.

It should be understood that the term "element" may be referring to a plate or a sheet (or be a plate-shaped element, or a sheet-shaped element) such as e.g. a bent plate or a bent sheet. That is, at least one of the first, second and third element may be comprised of a plate or a bent plate having at least a first wall portion, and a perpendicular second wall portion. The first wall portion may e.g. be a lateral wall portion, and the second wall portion may be a top or bottom wall portion, such as e.g. a second side wall portion. According to at least one example embodiment, the first element is plate-shaped and comprises said first element inner enveloping wall as a lateral wall portion, thus forming said interior volume such that the interior volume is opened to the surroundings on two opposite sides.

According to at least one example embodiment, said access opening of said intermediate space is a first access opening and said closing member is a first closing member, and wherein said first element, said second element and said third element are arranged such that said intermediate space has a second access opening arranged opposite to said first access opening; wherein said method further comprises the step of:

providing a second closing member arranged such that it covers said second access opening of said intermediate space, said second closing member being sealingly connected to at least said first element, whereby said assembled frame arrangement further comprises said second closing member.

Thus, the first element needs not to, when being provided, have a wall portion for receiving said plurality of pieces of a wrought material, but such wall portion may be provided as the steps of the method is carried out, e.g. as the first and/or second closing member. As an alternative, and as is described above, the first element may already when being provided, comprise a wall portion for receiving said plurality of pieces of a wrought material, e.g. as a bottom side wall portion (or a second side wall portion).

Stated differently, one of the first or second closing member may be in integral with said first element. Thus, according to at least one example embodiment, one of said first closing member and said second closing member is provided in integral with said first element and the other one of said first closing member and second closing members is provided separately from said first element; wherein said method further comprises the step of:

sealing said other one of said first closing member and said second closing member to said first element after the step of arranging a plurality of pieces of a wrought material in said intermediate space.

Thus, the first element may comprise a wall portion for receiving said plurality of pieces of a wrought material (e.g. one of said first closing member and said second closing member), which e.g. may be a second side wall, or a second side wall surface (or a bottom wall or a bottom wall surface) of said first element, and may be sealingly connected to a separate closing member (said other one of said first closing member and said second closing member).

According to at least one example embodiment, said one of said first closing member and said second closing member is provided in integral with said first element and said second element and/or said third element. Thus, the first element, the second element, and the third element may be referred to as a first element portion, a second element portion, and a third element portion, respectively. Such integral component may e.g. be manufactured by additive manufacturing, such as 3D-printing.

According to at least one example embodiment, one of said first closing member and said second closing member is a lid. That is, said other one of said first closing member and said second closing member which is provided separately from at least said first element, may be referred to as a lid.

According to at least one example embodiment, said first element may be referred to as an outer element, and said second element and said third element may be referred to as a first inner element and a second inner element, respectively.

According to at least one example embodiment, a cross-section of said second element and a cross-section of said third element has an irregular form or a regular form, e.g. rectangular, triangular, round or trapezoidal. According to at least one example embodiment, the cross-section of said second element is different from the cross-section of said third element. According to at least one example embodiment, a cross-section of said first inner element is the same or is different form as compared with one of said cross-section of said second and third inner elements.

According to at least one example embodiment, said first element is an outer canister and/or said second element is a first inner canister and/or said third element is a second inner canister.

According to at least one example embodiment, at least one of the first, second and third inner elements is a canister, or is shaped as a canister.

A canister is here typically understood as an element having a lateral wall portion (or an enveloping lateral wall portion) and a side wall portion (or a bottom wall portion) extending in a plane being perpendicular to said lateral wall portion. The lateral wall portion and the side wall portion are typically connected to each other, and thus form the limiting wall portions of the canister. For example, the first, second and/or third inner element may be formed as a canister by a deep drawing method.

According to at least one example embodiment, one of said second element and third element is a solid block. Hereby, at least parts of the metal based frame may be formed by said solid block.

According to at least one example embodiment, the method comprises the step of providing one or more further elements, such as e.g. a fourth element, and arranging the elements at least partly in said interior volume such that the intermediate space having an access opening is formed. Thus, any further elements may be used to form the intermediate space in said predetermined pattern. Hereby, even more complex predetermined patterns may be formed. Moreover, more than one intermediate space may be formed by at least one outer wall of an element and the first element inner enveloping wall.

According to at least one example embodiment, said plurality of pieces of a wrought material is a plurality of metal plates, sheets, foils, wires, wire meshes, rods, rings, ball bearings, tubes, tube segments, forged cubes, forged discs or combinations thereof.

In other words, said pieces of a wrought material relates to pieces such as plates, sheets, foils, wires, wire meshes, rods, rings, ball bearings, tubes, tube segments, forged cubes, forged discs or combinations thereof.

Such pieces are advantageous compared to e.g. powder, as powder provides a relatively low packing density, and may be associated with harmful inhalation during handling of the powder. Moreover, plates, sheets or foils may be beneficial due to the related relatively high packing density, approximate between 95% and 100%.

According to at least one example embodiment, each one of the pieces in the plurality of pieces of a wrought material, is larger than 1 mm, or 5 mm in at least one extension, such as e.g. larger than 1 mm, or 5 mm in diameter, or hydraulic diameter. According to at least one example embodiment, the mean size of the pieces in the plurality of pieces of a wrought material is larger than 1 mm or 5 mm. According to at least one example embodiment, said wrought material is not a powder, i.e. each one of the pieces in the plurality of pieces of a wrought material is larger than a powder particle.

According to at least one example embodiment, at least one of said plurality of pieces of a wrought material is a base plate.

Hereby, an increased stability of the assembled frame arrangement and/or the formed metal based frame may be achieved. Moreover, the base plate may be used to form the metal based frame in a desired manner. The base plate may e.g. be arranged between at least one of the closing members, and at least one of the first and second elements, such as e.g. between the first closing member and the first and second elements.

According to at least one example embodiment, the wrought material is a metal based material, e.g. a metal such as e.g. a metal of a high quality and a high strength.

According to at least one example embodiment, said wrought material is, or said plurality of pieces of a wrought material comprises, iron, stainless steel, nickel, aluminum, copper, titanium, magnesium, bronze, stainless steel, superduplex steel, precious metals e.g. gold or platinum, beryllium, zirconium, cobalt, nitinol, invar or magnesium combinations and/or alloys thereof. For example, a majority, such as e.g. all of the plurality of pieces of a wrought material comprises, iron, stainless steel, nickel, aluminum, copper, titanium, magnesium, bronze, stainless steel, superduplex steel, precious metals e.g. gold or platinum, beryllium, zirconium, cobalt, nitinol, invar or magnesium combinations and/or alloys thereof.

According to at least one example embodiment, the plurality of pieces of a wrought material, and at least one of, such as e.g. all of, the first element, the second element, the third element, and the closing member, are metal based components. The metal based components may for example be made solely of metal, or be made from a mixture of metal and another type of material. According to at least one example embodiment of the invention, each one of the metal based components comprises mainly metal. For example, comprises at least 51%, or at least 80%, or at least 90%, or at least 95%, or at least 100% metal. According to at least one example embodiment, at least one of the plurality of pieces of a wrought material comprises at least 51%, or at least 80%, or at least 90%, or at least 95%, or at least 100% metal.

According to at least one example embodiment, at least one of said plurality of pieces of a wrought material has different material properties as compared to another one of said plurality of pieces of a wrought material and wherein in said step of:

arranging a plurality of pieces of a wrought material in said intermediate space;

said at least one of said plurality of pieces of wrought material is provided to a predetermined location of said intermediate space.

Hereby, specific parts or portions of the metal based frame, corresponding to the predetermined location of said intermediate space, may be made of a material with different material properties as compared to other parts or portions of the metal based frame. Thus, these specific part or portions of the metal based frame may be made stronger by using a material with such material properties. Thus, a cost-effective method for strengthening these specific part or portions of the metal based frame is provided.

The wrought material with different material properties as compared to another one of said plurality of pieces of a wrought material, may e.g. be comprised of another material, such as another metal, as compared to another one of said plurality of pieces of a wrought material.

According to at least one example embodiment, said method further comprises the step of:

treating the plurality of pieces of a wrought material by surface treatment such as grinding, lapping, polishing, and/or cleaning, and/or deformation treatment prior to the step of:

arranging a plurality of pieces of a wrought material in said intermediate space.

Thus, at least some of the pieces of a wrought material in the intermediate space has been surface treated, and/or deformation treatment, prior to be subjected to the hot pressing process step. The surface treatment may as stated be e.g. grinding, lapping, polishing, and/or cleaning. It should be noted that the coating may according to at least one embodiment be considered to be comprised in general term of "surface treating". However, according to at least yet another embodiment, the coating may be considered to be the act of adding a layer to at least some of the pieces of a wrought material, and hence not a treatment of the surface of at least some of the pieces of a wrought material per se. Hence, additionality or alternatively, the method comprises the step of coating the plurality of pieces of a wrought material prior to the step of arranging a plurality of pieces of a wrought material in said intermediate space.

Grinding, lapping, polishing, cleaning and/or coating of at least some of the pieces of a wrought material is done in order to ensure, or at least improve, metallurgical bonding during the hot pressing process step. During grinding, lapping, polishing, cleaning and/or coating step, dirt and/or oxides may be removed from the surface of at least some of the pieces of a wrought material, and/or the properties of the at least one surface may be altered, of at least some of the pieces of a wrought material. Hereby, direct contact between two facing surfaces of two neighboring pieces of a wrought material may be improved.

According to at least one example embodiment, the choice between the techniques grinding, lapping, polishing, cleaning and/or coating is material dependent. In other words, depending on which metal that is used in the plurality of pieces of a wrought material, different techniques or different combination of techniques may be used. For example, for a for a certain kind of metal, only cleaning may be needed or preferred, whereas for another kind of metal, cleaning, polishing and/or coating may be needed, or preferred, in order to ensure, or improve, metallurgical bonding during the hot pressing process step.

According to at least one example embodiment of the invention, when coating is performed, traces or residues of the coating may be visible in the final, or manufactured, metal based frame, and therefore the coating may act as a finger print for the method when used.

The deformation treatment may e.g. be bending, corrugating, pressing, dimpling or combinations thereof. According to at least one example embodiment, the method comprises the step of forming the plurality of pieces of a wrought material prior to the step of arranging a plurality of pieces of a wrought material in said intermediate space. According to at least one example embodiment, the method comprises the step of hardening the plurality of pieces of a wrought material by surface treatment.

According to at least one example embodiment, said second element and/or said third element is a pre-manufactured element, e.g. a cut-out of a pipe.

By pre-manufacturing the second element and/or the third element, the size and dimension of the corresponding second and/or third element can be chosen to define at least parts of the pre-defined pattern of the intermediate space, and/or the final shape of the metal based frame. Thus, the manufacturing of the metal based frame may be facilitated, as at least parts, here the second element and/or the third element, has been pre-made to its desired form. The second and/or third element may e.g. be made by a deep drawing method.

According to at least one example embodiment, said method further comprises further steps of:

providing a solid spacer to said intermediate space; and machining away said solid spacer after the step of subjecting said assembled frame arrangement to a hot pressing process.

Thus, the solid spacer may be used to desirably shape the metal based frame, without being used in the end product, i.e. the final metal based frame. Thus, the solid spacer is used as a sacrifice, and may thus be referred to as a solid sacrificial spacer. For example, the solid spacer may be made out of a cheaper material compared to the plurality of pieces of a wrought material, such as e.g. steel or aluminum.

According to at least one example embodiment, in said step of removing gas from said intermediate space, at least 50%, or at least 60%, or at least 70%, or at least 80, or at least 90% of the gas is removed from said intermediate space compared to prior to the step of removing gas from intermediate space. In other words, said step of removing gas from said intermediate space, may comprise providing a vacuum, or a partial vacuum, in said intermediate space. Stated differently, said step of removing gas from said intermediate space, may comprise providing an under-pressure in said intermediate space.

According to at least one example embodiment, said step of removing gas from said intermediate space comprises the sub-steps of:

providing at least one gas evacuating aperture in said assembled frame arrangement, which gas evacuating aperture is fluidly connected to said intermediate space;

evacuating gas from said intermediate space via said at least one gas evacuating aperture.

Hereby, gas may be removed from said intermediate space in a relatively straightforward way. Thus, the intermediate space is in fluid communication with surfaces, such as internally arranged surfaces, of the plurality of pieces of a wrought material. Hereby, gas, typically air, can be evacuated from the assembled frame arrangement, thus providing a vacuum, or a partial vacuum, between the surfaces of different pieces of the plurality of pieces of a wrought material. Hereby, the metallurgically bonding of the plurality of pieces of a wrought material is improved. Hence, for such embodiments, the gas is removed from the intermediate space to an outside of said assembled frame arrangement by e.g. using a suction device connected to said at least one gas evacuating aperture.

According to at least one example embodiment of the invention, said at least one gas evacuating aperture is arranged in the envelope (i.e. the outer facing surfaces) of said assembled frame arrangement, e.g. in said first element or said closing member.

According to at least one example embodiment of the invention, the shape of said at least one gas evacuating aperture is circular. Alternatively, the at least one gas escaping aperture may be elliptical or simply be described as having a round shape. The at least one gas evacuating may be described as a gas evacuating hole or as a gas evacuating opening. Yet alternatively, the gas escaping aperture may have the shape of a line, e.g. a groove or a slit, or it may have any regular or irregular form. According to one example embodiment, the gas evacuating aperture may have a pre-defined form.

According to at least one example embodiment, the gas evacuating aperture is provided to said first element or to said closing member (e.g. to said first or to said second closing member).

According to at least one example embodiment, the method comprises the steps of:

arranging a gas evacuating crimp tube to said assembled frame arrangement, wherein an opening of said gas evacuating crimp tube covers said at least one gas evacuating aperture; and sealing said gas evacuating crimp tube after the step of evacuating said gas from said intermediate space and prior to the step of subjecting said assembled frame arrangement to a hot pressing process.

It should be understood that the term cover here means that the diameter of the opening of the crimp tube, i.e. the inner diameter of the crimp tube, is larger than the corresponding size of the at least one gas evacuating aperture. In other words, the opening of the crimp tube surrounds the at least one gas evacuating aperture.

Thus, gas may be removed from the intermediate space by evacuating gas from said intermediate space via said at least one gas evacuating aperture using said gas evacuating crimp tube. Moreover, the crimp tube may be used to test the degree of vacuum in the intermediate space, e.g. by connecting it to a vacuum pump.

According to at least one alternative example embodiment, said step of removing gas from said intermediate space comprises the sub-step of:

providing a chemical substance within said intermediate space, said chemical substance being configured to react with said gas in said intermediate space in order to remove said gas.

Hence, for such embodiments, the gas evacuating aperture can be omitted, as the gas within the intermediate space may react with said chemical substance in such a way that the gas is removed. It should be noted that the gas may thus be removed by a reaction with the chemical substance forming e.g. a solid material (i.e. not a gas), and/or be removed by absorption and trapping of the gas in the chemical substance.

The chemical substance may e.g. be held in the intermediate space, such as e.g. in a separate portion of the intermediate space, which separate portion later on can be removed (e.g. machined away) from the metal based frame.

According to at least one example embodiment, said chemical substance is a Calcium based compound. For example, said chemical substance comprises at least one of the following substances: Ca, Ti, Zr, Ca—Mg, Ca—Al, Ca—Zn, Ca—Cu, any alloy of the same or any eutectic alloys.

According to at least one example embodiment, said chemical substance is molten, e.g. it may be comprised in a powder which subsequently melts during heating. According to at least one example embodiment, said chemical substance is configured to react with oxygen, nitrogen, hydrogen, water and/or a hydrocarbon.

According to at least one example embodiment, the method comprises the step of heating said chemical substance in order to make it react with said gas in the intermediate space. The amount of heating needed is dependent on the chosen chemical substance which is well known to the person skilled in the art.

According to at least one example embodiment, the step of heating said chemical substance is comprised in said step of subjecting said assembled frame arrangement to a hot pressing process (e.g. the HIPping process step). Hence, according to such embodiments, the chemical substance will be heated during the initial time of the hot pressing process step.

Stated differently, and according to one example embodiment, the step of removing said gas from said intermediate space is a sub-step in said step of subjecting said assembled frame arrangement to a hot pressing process.

According to at least one example embodiment of the invention, the predetermined time and the predetermined temperature used during the hot pressing process are within the ranges of what is normally used within the hot pressing industry, e.g. within the HIPping industry. For example, the predetermined time may be within the range of 1 h to 12 h, the pressure may be within the range of 100 MPa to 200 MPa, and the predetermined temperature may be within the range of 500° C. to 1300° C. The predetermined time, the predetermined pressure and the predetermined temperature may all vary due to a variety of parameters known to the skilled person. For example, they may vary due to the size or the shape of the metal based frame which is being manufactured. Further, they may vary due to the material choice, e.g. which metal is being used. It should be noted that hot pressing or HIPping can be used for producing or manufacturing other metal based components than metal based frames.

Thus, each one of the plurality of pieces of a wrought material may bond metallurgically to at least another piece of said plurality of pieces of a wrought material.

It should be understood that during the hot pressing process, at least the of plurality pieces of a wrought material bonds to each other metallurgically. More specifically, the plurality pieces of a wrought material bonds to each other metallurgically in a multiaxial matter due to the hot pressing.

It should be noted that the metal based frame typically comprises a metal member for enabling a strong and resistant structure, and at least one or two cavities in between different portions of the metal member in order to keep the weight low, or relatively low compared to as solid construction. The metal based frame is typically used as a load bearing structure, and may e.g. be a single-piece metal based component.

According to a second aspect of the present inventive concept, a metal based frame is provided. The metal based frame comprises:

a first side, a second side arranged opposite to said first side, and a lateral side extending from said first side to said second side;

a frame arrangement having an outer metal based border defined by at least the lateral side of said metal based frame, and an inner metal based member separating at least two cavities forming at least a part of said frame arrangement;

wherein at least a portion of said inner metal based member has been produced by a plurality of pieces of a wrought material which have been metallurgically bonded to each other during the process of a hot pressing, such as e.g. hot isostatic pressing, for a predetermined time at a predetermined pressure and a predetermined temperature wherein the ratio, by volume, of cavities:metal in the frame is at least 3.

Hereby, a strong metal based frame with a high density and with relatively low residual stresses can be manufactured in which hot pressing, or HIPping, for a predetermined time at a predetermined pressure and a predetermined temperature, has been used at least to metallurgically bond the plurality of pieces of a wrought material to form said inner metal based member, or at least a portion of said inner metal based member. Furthermore, the ratio, by volume, of cavities to metal in the frame reduces the weight significantly as compared to solid constructions. In some examples, the ratio, by volume, of cavities:metal in the frame is at least 3, such as at least 3.5, at least 4, at least 4.5, at least 5 or at least 5.5. This means that the volume of the cavities in the frame is at least 3 times the volume of metal in the frame. In some embodiments, the ratio, by volume of cavities to metal is in the range of 3-10, such as in the range of 3-7, preferably 3-6.

The volume of the metal can be calculated as the volume of the outer dimensions of the metal based frame from which the total volume of the cavities has been subtracted.

According to at least one example embodiment, said outer metal based border is comprised in said inner metal based member. Stated differently, according to at least one example embodiment, said inner metal based member comprises said outer metal based border.

According to at least one example embodiment, the shape of said outer metal based border is defined by a first element used as an outer element during the process of hot pressing for a predetermined time at a predetermined pressure and a predetermined temperature.

The first element in this second aspect may be the same, or corresponding to, the first element of the first aspect of the inventive concept. Thus, effects and features of the first element of this second aspect of the inventive concept, are largely analogous to those described above in connection with the first element of the first aspect of the inventive concept. Embodiments mentioned in relation to the first element of the first inventive concept are largely compatible with the first element of the second aspect of the inventive concept.

According to at least one example embodiment, said at least two cavities are partitioned from each other by said inner metal based member such that a predetermined pattern of said inner metal based member is formed inside of said outer metal based border.

According to at least one example embodiment, at least one of the cavities is a through hole. This means that the metal based frame comprises at least one cavity in the shape of a through hole. Herein, the term "through hole" refers to a hole that goes all the way through the frame. The provision of such through holes is advantageous in that it reduces the weight of the frame significantly, compared to solid constructions.

The predetermined pattern in this second aspect may be the same, or corresponding to, the predetermined pattern of the first aspect of the inventive concept. Thus, effects and features of the predetermined pattern of this second aspect of the inventive concept, are largely analogous to those described above in connection with the predetermined pattern of the first aspect of the inventive concept. Embodiments mentioned in relation to the predetermined pattern of the first inventive concept are largely compatible with the predetermined pattern of the second aspect of the inventive concept.

According to at least one example embodiment, said predetermined pattern is defined by a second element having a second element outer wall, and a third element having a third element outer wall, wherein said first and second elements have been arranged at least partly in an interior volume at least partly defined by a first element inner enveloping wall of said first element, such that an intermediate space has been formed between said first element inner enveloping wall and said second element outer wall and said third element outer wall in said predetermined pattern; and wherein said plurality of pieces of a wrought material which have been metallurgically bonded to each other during the process of a hot pressing for a predetermined time at a predetermined pressure and a predetermined temperature, has been arranged in said intermediate space with said predetermined pattern.

Thus, the metal based frame of this second aspect may have been manufactured by in a similar manner as the method according to the first aspect of the inventive concept.

According to at least one example embodiment, the metal based frame according to the second aspect of the present inventive concept has been manufactured by the method according to the first aspect of the inventive concept.

Effects and features of this embodiment of the second aspect of the present inventive concept are thus largely analogous to those described above in connection with the first aspect of the inventive concept. Embodiments mentioned in relation to the first aspect of the present inventive concept are largely compatible with this embodiment of the second aspect of the inventive concept.

According to a third aspect of the present inventive concept, a metal based frame is provided. The metal based frame has been manufactured by the method according to the first aspect of the inventive concept.

Effects and features of this third aspect of the present inventive concept are thus largely analogous to those described above in connection with the first aspect of the inventive concept. Embodiments mentioned in relation to the first aspect of the present inventive concept are largely compatible with the third aspect of the inventive concept.

According to at least one example embodiment, the metal based frame according to the inventive concept comprises metallurgical detectable traces of said plurality of pieces of wrought material, wherein said metallurgical detectable traces are formed by crystallographic mismatch at interfaces between different pieces in said plurality of pieces of a wrought material.

According to at least one example embodiment, the metallurgical detectable traces are significant of the bonding of different pieces in said plurality of pieces of a wrought material during the hot pressing process (e.g. HIPping process), i.e. during the process of a hot pressing for a predetermined time at a predetermined pressure and a predetermined temperature. For example, the former interface between two pieces of a wrought material, each one of the pieces being a sheet or a plate or a foil, may be traced as the trace appears as a straight line, along which line metal grains is arranged. Hence, the term trace may be interpreted as the traceable formation of residues or residuals of the former interfaces.

According to at least one example embodiment of the invention the traces mentioned above is made visible through etching of a cross-sectional sample of the metal based frame.

BRIEF DESCRIPTION OF THE DRAWINGS

The above objects, as well as additional objects, features and advantages of the present inventive concept, will be more fully appreciated by reference to the following illustrative and non-limiting detailed description of embodiments of the present invention, when taken in conjunction with the accompanying drawings, wherein.

DETAILED DESCRIPTION OF THE DRAWINGS

In the present detailed description, embodiments of the present invention will be discussed with reference to the accompanying figures. It should be noted that this by no means limits the scope of the invention, which is also applicable in other circumstances for instance with other types or variants of methods for manufacturing a metal based frame encompassed by the scope of the claims, than the embodiments shown in the appended drawings. Further, that specific features are mentioned in connection to an embodiment of the invention does not mean that those features cannot be used to an advantage together with other embodiments of the invention.

Figure 1:
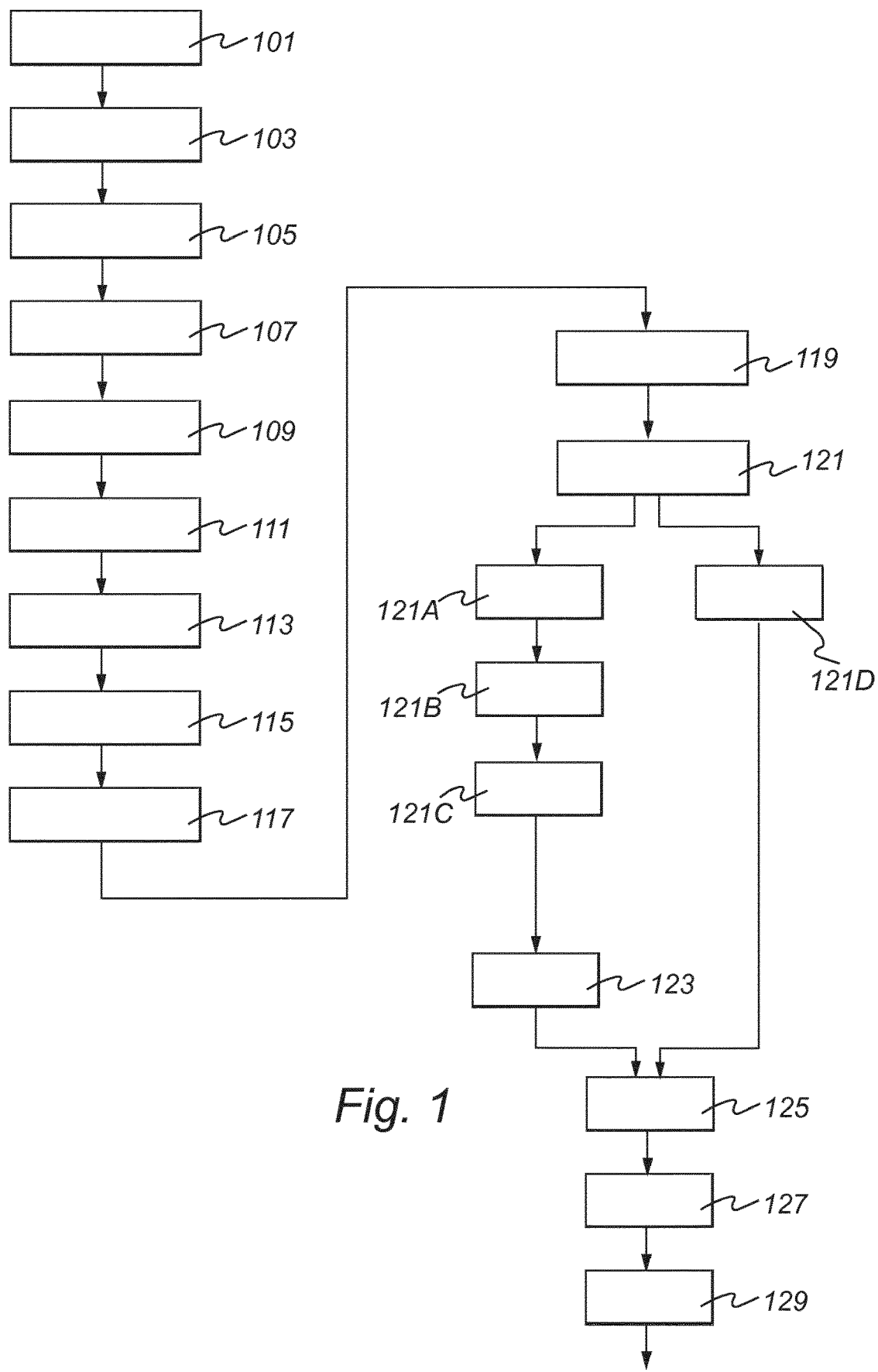
FIG. 1 shows a flow-chart explaining the steps of a method in accordance with at least one embodiment of the invention.

Turning to FIG. 1, showing a flow chart of the steps in a method 100 for manufacturing a metal based frame according to at least one embodiment of the inventive concept. The metal based frame being the result of the method described in relation to FIG. 1 may e.g. be identical to metal based frame shown in any of the other figures.

In a first step 101, a first element comprising a first element inner enveloping wall surrounding an interior volume is provided. The interior volume is at least partly defined by the first element inner enveloping wall.

The first element may e.g. be an outer element, such as e.g. an outer canister further explained below.

In a second step 103, a second element having a second element outer wall, and a third element having a third element outer wall are provided.

The second element and the third element may be referred to as a first inner element and a second inner element, respectively. Correspondingly to the first element, any one of the second and third elements may be an inner canister.

In a third step 105, the second element and the third element is at least partly arranged in the interior volume, such that an intermediate space having an access opening is formed between the first element inner enveloping wall and the second element outer wall and the third element outer wall in a predetermined pattern.

According to at least one example embodiment, in an optional fourth step 107 a plurality of pieces of a wrought material is treated by a surface treatment and/or by a deformation treatment.

Hereby, the pieces of a wrought material are prepared for the metallurgical bonding during the hot pressing step, such as e.g. the HIPping process step. For example, the surface treatment of at least some of the pieces of a wrought material is done in order to ensure, or at least improve, metallurgical bonding during the hot pressing process step In an optional fifth step 109, a solid spacer is provided to the intermediate space.

In a sixth step 111, a plurality of pieces of a wrought material is arranged in the intermediate space.

Preferably, the plurality of pieces of a wrought is inserted into the intermediate space via the access opening. In correspondence to the optional fifth step 109, the plurality of pieces of a wrought material may be arranged on the solid spacer.

According to at least one example embodiment, at least one of the plurality of pieces of a wrought material has different material properties as compared to another one of the plurality of pieces of a wrought material. Thus, the method 100 may comprise an optional seventh step 113 of arranging a plurality of pieces of a wrought material in the intermediate space such that the at least one of the plurality of pieces of wrought material is provided to a predetermined location of the intermediate space.

In an eighth step 115, a closing member is provided and arranged such that it covers at least the access opening of the intermediate space, said closing member being sealingly connected to at least the first element. Hereby, an assembled frame arrangement is created which comprises the first element, the second element, the third element, the plurality of pieces of a wrought material, and the closing member.

The assembled frame arrangement may e.g. be referred to as a pre-hot pressing arrangement or pre-HIPping arrangement depending on the hot pressing process used, as it has been prepared for the making of a metal based frame by hot pressing or HIPping.

According to at least one example embodiment, the access opening of the intermediate space is a first access opening and the closing member is a first closing member, and the first element, the second element and the third element are arranged such that the intermediate space has a second access opening arranged opposite to the first access opening, wherein the method 100 comprises an optional ninth step 117 of providing a second closing member arranged such that it covers the second access opening of the intermediate space, which second closing member is sealingly connected to at least the first element. Hereby, the assembled frame arrangement further comprises the second closing member.

The optional ninth step 117 may according to one embodiment be carried out in a parallel to the eight step 115.

According to at least one example embodiment, one of the first closing member and the second closing member is provided in integral with the first element and the other one of the first closing member and second closing members is provided separately from the first element, wherein the method 100 further comprises an optional tenth step 119 of sealing the other one of the first closing member and the second closing member to the first element at least after the sixth step 111 of arranging a plurality of pieces of a wrought material in the intermediate space.

In an eleventh step 121, gas is removed from the intermediate space.

Hereby, the metallurgically bonding of the plurality of pieces of a wrought material is improved.

According to at least one example embodiment, the eleventh step 121 of removing gas from the intermediate space comprises the sub-step 121A of providing at least one gas evacuating aperture in the assembled frame arrangement, which gas evacuating aperture is fluidly connected to the intermediate space, and the sub step 121B of evacuating gas from the intermediate space via the at least one gas evacuating aperture. Optionally, the sub step 121B may comprise a step 121C of arranging a gas evacuating crimp tube to the assembled frame arrangement, wherein an opening of the gas evacuating crimp tube covers the at least one gas evacuating aperture. For such embodiments, the method may comprise a twelfth step 123 of sealing the gas evacuating crimp tube, at least after the sub-step 121B of evacuating the gas from the intermediate space.

According to at least one alternative example embodiment, the eleventh step 121 of removing gas from the intermediate space comprises the sub-step 121D of providing a chemical substance within the intermediate space, the chemical substance being configured to react with the gas in the intermediate space in order to remove the gas. The sub-step 121D is typically an alternative path to the combined sub-steps of 121A-121C and optionally the twelfth step 123.

The step of providing a chemical substance within the intermediate space 121D, may be followed by a step of heating the chemical substance in order to make it react with the gas in the intermediate space (if this is required for the chemical substance used). However, the step of heating the chemical substance may be comprised in the step of subjecting the assembled frame arrangement to a hot pressing process.

In a thirteenth step 125, the assembled frame arrangement is subjected or exposed to hot pressing process (such as e.g. a HIPping process) for a predetermined time at a predetermined pressure and a predetermined temperature. Hereby at least the plurality of pieces of a wrought material bond metallurgically to each other, to form the metal based frame.

In a fourteenth step 127, at least a portion of one of the first element, the second element, the third element, and the closing member is removed.

The optional fourteenth step 127 is preferably carried out subsequently to the thirteenth step 125. Thus, the metal based frame from the thirteenth step 125 is re-shaped or reduced in size by the optional fourteenth step 127.

In an optional fifteenth step 129, the solid spacer from the optional fifth step 109, is machined away.

Thus, the solid spacer is used as a sacrifice, and may thus be referred to as a solid sacrificial spacer.

Figure 2:
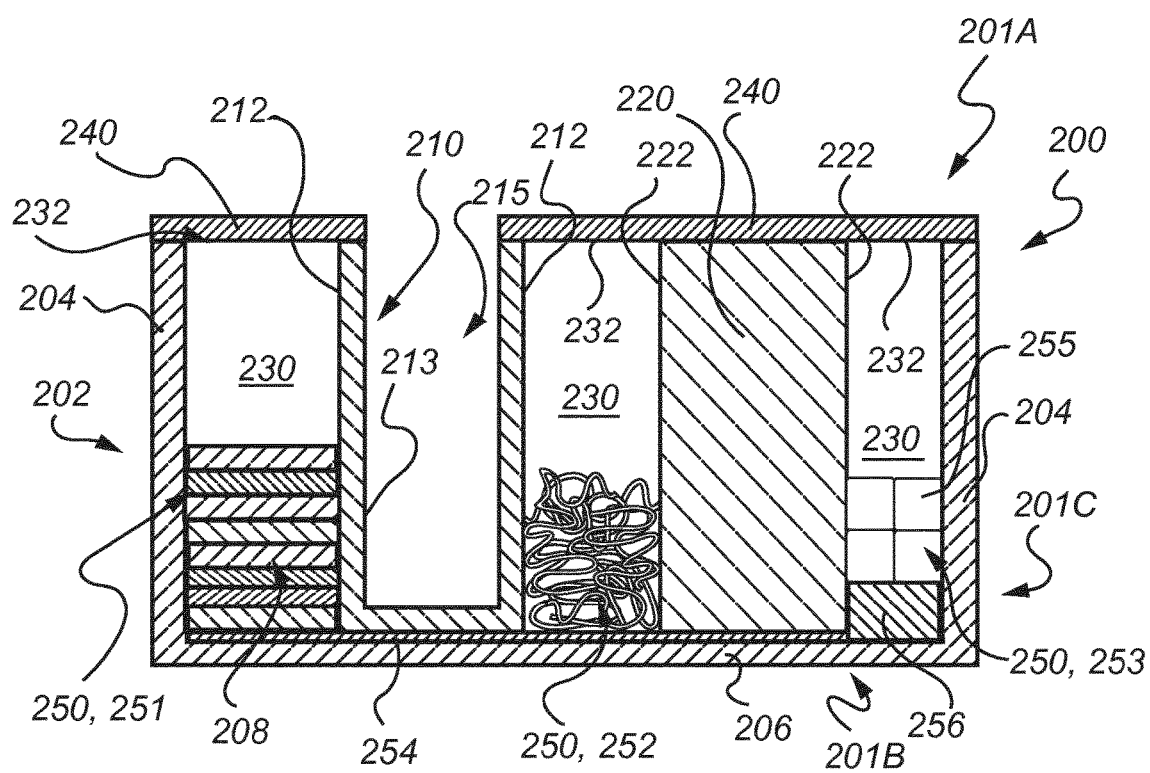
FIG. 2 show schematic, cross-sectional view of an assembled frame arrangement in accordance with at least one example embodiment of the invention.

FIG. 2 shows a cross-section of an assembled frame arrangement 200 formed e.g. in the eighth 115 or ninth step 117 of the method 100 described with reference to FIG. 1 The assembled frame arrangement 200 has a first side 201A, and opposite second side 201B, and a lateral side 201C connecting the first side 201A with the second side 201B.

Figure 3:
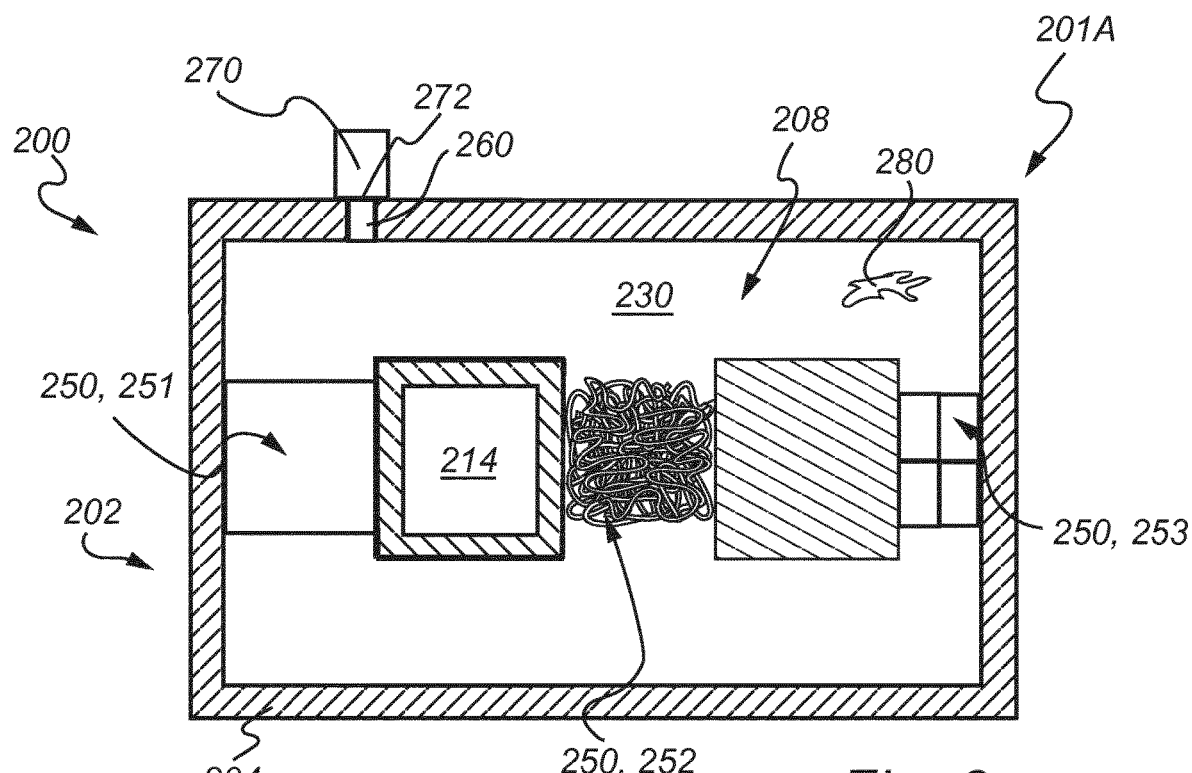
FIG. 3 shows a schematic, cross-sectional view of the assembled frame arrangement of FIG. 2 in another view, in accordance with at least some example embodiments of the invention.

The assembled frame arrangement 200 comprises a first element 202 having a first element inner enveloping wall 204 (the enveloping feature of the first element inner enveloping wall 204 is better shown in FIG. 3), which will be referred to as the inner enveloping wall 204 henceforth, and having a first element bottom wall 206, which will be referred to as a bottom wall 206 henceforth (the bottom wall 206 may also be referred to as a first element second side wall 206). The main extension of the bottom wall 206 is perpendicular to the main extension of the inner enveloping wall 204. The inner enveloping wall 204 is sealingly connected to the bottom wall 206 such that an interior volume 208 is formed inside of the inner enveloping wall 204 and the bottom wall 206. It should be noted that as the inner enveloping wall 204 and the bottom wall 206 are sealingly connected to each other, they may be referred to as wall portions, i.e. an inner enveloping wall portion 204 and a bottom wall portion 206.

The interior volume 208 is at least partly defined by the inner enveloping wall 204 and the bottom wall 206. For embodiments in which the first element 202 comprises no bottom wall 206, but only the inner enveloping wall 204, the interior volume 208 is at least partly defined by the inner enveloping wall 204.

As seen in FIG. 2, the assembled frame arrangement 200 further comprises a second element 210 having a second element outer wall 212 and a second element inner wall 213 surrounding a free space 215, and a third element 220 having a third element outer wall 222. The second element 210 and the third element 220 are arranged in the interior volume 208 formed by the first element 202. In FIG. 2, the second element 210 is formed as a canister having inner walls 213 surrounding a free space 215, and may be referred to as an inner canister 210. Moreover, in FIG. 2, the third element 220 is formed as a solid block 220, and may be referred to as an inner block 220. However, it should be noted that the third element 220 may be shaped differently, e.g. as a canister similar to the second element 210, and may thus e.g. form a second inner canister. The third element preferably has third element inner walls surrounding a free space. Correspondingly, the second element 210 may be shaped differently, e.g. as a solid block similar to the third element 220, and may thus e.g. form a second inner block. Preferably, both elements has inner walls that surrounds a free space 215.

The second element 210 and the third element 220 are arranged inside the interior volume 208 such that an intermediate space 230 is formed in a predetermined pattern. The intermediate space 230 is at least partly defined by the inner enveloping wall 204, the second element outer wall 212 and the third element outer wall 222. Furthermore, the intermediate space 230 has an access opening 232 at the first side 201A of the assembled frame arrangement 200, which access opening 232 in FIG. 2 is closed by a closing member 240, or a lid 240. The closing member 240 may be a single unit covering different portions of the intermediate space 230, or the closing member 240 may be comprised of different parts for covering the different portions of the intermediate space 230. In FIG. 2, the closing member 240 is sealingly connected to the first element 202 and the second element 210, and optionally to the third element 220, for example the closing member 240 may be welded at the first side 201A of the assembled frame arrangement 200 to the first element 202, the second element 210 and to the third element 220. By sealingly connecting the closing member 240 to the first element 202, the second element 210 and to the third element 220, the intermediate space 230 is sealed from the surroundings, possibly with the exception of a gas evacuating aperture as shown in FIG. 3.

Depending on the size and dimension (or shape) of the second element 210 and the third element 220, and their respective arrangement in the interior volume 208, the closing member 240 may only be sealingly connected to the first element 202. For example, if the second element 210 and the third element 220 are solid blocks, the closing member may cover the first side of the assembled frame arrangement 200, and be sealingly connected around the circumference of the enveloping inner wall 204.

In the intermediate space 230, a plurality of pieces of a wrought material 250 is arranged, of which only some pieces are shown for reasons of brevity. The plurality of pieces of a wrought material 250 has preferably been introduced into the intermediate space 230 by the access opening 232 prior to the application of the closing member 240. In FIG. 2, the pieces of a wrought material are embodied as plates 251 (or sheets or foils or rings or discs or ball bearing), wires 252 (or wire meshes, or rods or tubes or tube segments) and cubes 253 (e.g. forged cubes). It should be noted that different types of plurality of pieces of a wrought material 250 are shown here for exemplifying reasons, and typically, the same type of pieces of a wrought material 250 are provided in the intermediate space 230.

According to at least one example embodiment, at least one of the plurality of pieces of a wrought material is a base plate 254, which e.g. may be arranged between the bottom wall 206 and the second element 210 and third element 220. Hereby, an increased stability of the assembled frame arrangement 200 and/or the formed metal based frame may be achieved.

According to at least one example embodiment, at least one 255 of the plurality of pieces of a wrought material 250 has different material properties as compared to another one of the plurality of pieces of a wrought material 250. Moreover, such piece of a wrought material 255 may be arranged in the intermediate space 230 in a predetermined location, in order to provide specific portions of the formed metal based frame with certain characteristics, e.g. being harder by choosing the piece of a wrought material 255 to have relatively harder material properties.

According to at least one example embodiment, a solid spacer 256 may be arranged in the intermediate space 230, the solid spacer not being part of the plurality of pieces of a wrought material 250. Such solid spacer 256 may later be machined away from the formed metal based frame. The solid spacer 256 may thus be used as a sacrifice, and may be referred to as a solid sacrificial spacer 256. For example, the solid spacer may be made out of a cheaper material compared to the plurality of pieces of a wrought material 250

According to at least one example embodiment, the closing member 240 may be referred to as a first closing member 240, and the bottom wall 206 of the first element may be referred to as a second closing member 206, as it closes the interior volume at the second side 201B of the assembled frame arrangement 200. In other words, the second closing member 206 may be described as being arranged such that it covers a second access opening of the intermediate space 230, which second access opening is arranged opposite to the first access opening 232, wherein the second closing member 206 is sealingly connected to the inner enveloping wall 204 of the first element 202. Thus, the second closing member 206 may be described as being integrated with, or being in integral with the first element 202, or more specifically, the inner enveloping wall 204 of the first element 202, as compared to the first closing member 240 which is, prior to being sealed to at least the first element 202, provided separately from the first element 202.

The assembled frame arrangement 200 in FIG. 2 may be subject to the operations of removing gas from the intermediate space 230 (see FIG. 3 below), and subjecting the assembled frame arrangement 200 to a hot pressing process (e.g. a HIPping process), i.e. a hot pressing process for a predetermined time at a predetermined pressure and a predetermined temperature. During the hot pressing process, metal based components, being in contact with each other, will metallurgically bond to each other. For the assembled frame arrangement 200, typically at least the plurality of pieces of a wrought material 250 will bond metallurgically to each other, to form a metal based frame, or at least a part or portion of the metal based frame (examples of metal based frame formed from an assembled frame arrangement according to the inventive concept are shown in FIGS. 4, 5a-5d, 6 and 7). However, as the first element 202, the second element 210, the third element 220 and the closing member 240 typically are metal-based, the first element 202, the second element 210, the third element 220, the closing member 240 and the plurality of pieces of a wrought material 250 will bond metallurgically to each other during the hot pressing process. According to at least one example embodiment, at least a portion of one of the first element 202, the second element 210, the third element 220 and the closing member 240 are removed from the metal based frame in order to reshape or resize the metal based frame.

FIG. 3 shows a cross-section of the assembled frame arrangement 200 in a perpendicular view to that of FIG. 2, in a view direction from the first side 201A towards the second side 201B of the assembled frame arrangement 200. In FIG. 3, the closing member 240 is removed for increased visibility, but the closing member 240 typically covers the whole first side 201A of the assembled frame arrangement 200 except for the internal cavity 214 formed by the second element 210.

Hence, prior to providing the closing arrangement 240 to the assembled frame arrangement 200, the interior volume 208, and the intermediate space 230 is opened to the surroundings (similar to what is shown in FIG. 3 with the closing member 240 removed). Hereby, the second element 210 and the third element 220 may be added to the interior volume 208, and subsequently, the plurality of pieces of a wrought material 250 may be added to the intermediate space 230.

In FIG. 3, the bottom wall 206, and the cross-section of the inner enveloping wall 204, are rectangular, but another shape of the bottom wall 206, and the cross-section of the inner enveloping wall 204 is within the concept of the invention. However, according to at least one example embodiment, the shape of the bottom wall 206, and the cross-section of the inner enveloping wall 204 is similar or the same.

In order to remove gas from the intermediate space 230, the assembled frame arrangement 200 of FIG. 2 or FIG. 3 may be provided with at least one gas evacuating aperture 260, as shown in FIG. 3. The gas evacuating aperture 260 is fluidly connected to the intermediate space 230. Moreover, a gas evacuating crimp tube 270 may be arranged to the assembled frame arrangement 200 such that an opening 272 of the gas evacuating crimp tube 270 covers the at least one gas evacuating aperture 260. Hereby gas can be removed from the intermediate space 230 by being evacuated from the intermediate space 230 via the at least one gas evacuating aperture 260 using the gas evacuating crimp tube 270.

As an alternative to remove gas from the intermediate space 230 using the gas evacuating aperture 260 and optionally the gas evacuating crimp tube 270, is to remove gas by a providing a chemical substance 280 within the intermediate space 230, the chemical substance 280 being configured to react with the gas in the intermediate space 230 in order to remove the gas.

As mentioned previously, the step of providing a chemical substance 280 within the intermediate space 230, may be followed by a step of heating the chemical substance 280 in order to make it react with the gas in the intermediate space 230 (if this is required for the chemical substance used). However, the step of heating the chemical substance 280 may be comprised in the step of subjecting the assembled frame arrangement 200 to a hot pressing process.

Figure 4:
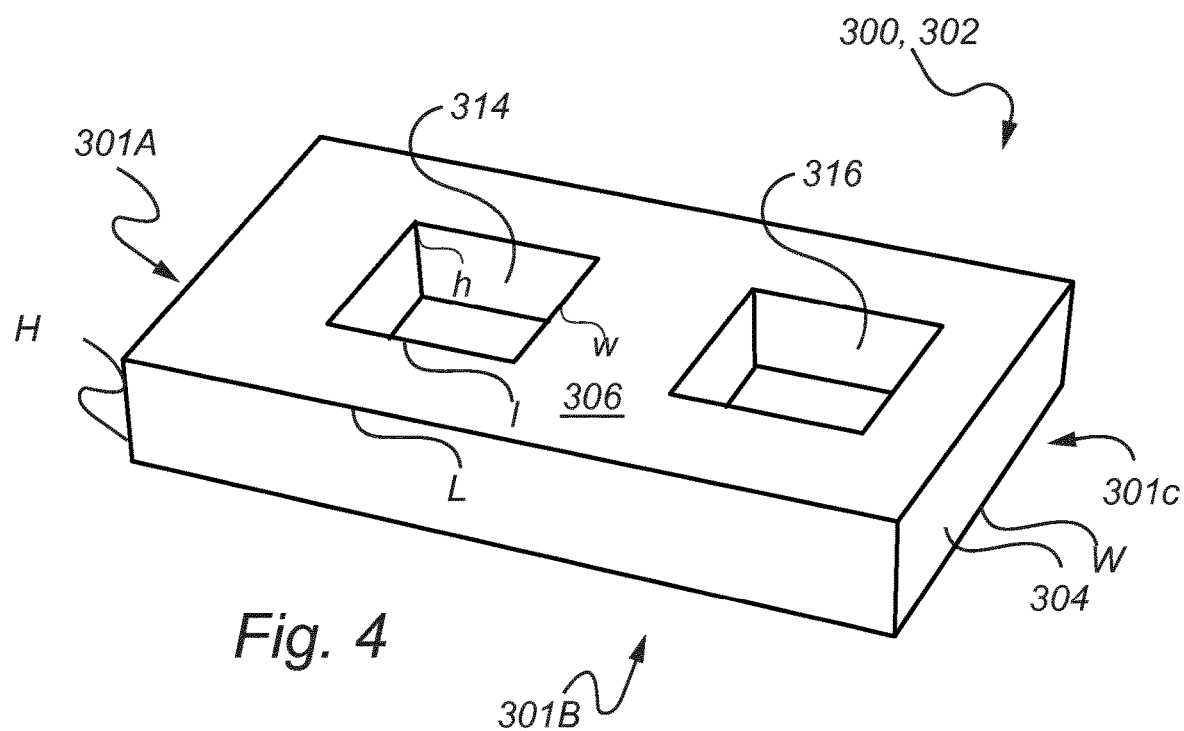
FIG. 4 shows a schematic, perspective view of a meat based frame in accordance with at least one example embodiment of the invention.

FIG. 4 shows a metal based frame 300 formed by a hot pressing process of for example the assembled frame arrangement 200 of FIG. 2 and FIG. 3, but where the third element 220 formed as a block has been removed subsequent to the hot pressing process step. Alternatively, the metal based frame 300 of FIG. 4 may be formed by an assembled frame arrangement 200 of FIG. 2 and FIG. 3 but with the exception of providing the third element 220 as a canister, similar to the second element 210.

The metal based frame 300 comprises a first side 301A corresponding to the first side 201A of the assembled frame arrangement 200, a second side 301B arranged opposite to the first side 301A, the second side 301B of the metal based frame 300 corresponding to the second side 201B of the assembled frame arrangement 200. Furthermore, the metal based frame 300 comprises a lateral side 301C extending from the first side 301A to the second side 301B. The frame 300 has a length L, height H and width W and thus the volume of the outer dimensions of the frame 300 is W×L×H. The metal based frame 300 has a volume of metal that may be calculated by calculating the that a solid component having the same outer dimensions would have and subtract the volume of the cavities.

As shown in FIG. 4, the metal based frame 300 comprises a frame arrangement 302 having an outer metal based border 304 defined by at least the lateral side 301C of the metal based frame 300, and an inner metal based member 306 separating at least two cavities, i.e. a first cavity 314 and a second cavity 316 forming at least a part of the frame arrangement 302. Each cavity 314 and 316 has a length l, height h and width w, and thus a volume of w×l×h. Preferably, both cavities have the same dimensions. Thus, the metal volume of the frame can be calculated as W×L×H−(2(w×l×h).

At least a portion of the inner metal based member 306 comprises, or is made by, a plurality of pieces of a wrought material which have been metallurgically bonded to each other during a hot pressing process (e.g. HIPping), i.e. the process of a hot pressing for a predetermined time at a predetermined pressure and a predetermined temperature. Moreover, the shape of the outer metal based border 304 may e.g. be defined by the first element 202 used as an outer element during the hot pressing process.

The first cavity 314 typically corresponds to the internal cavity 214 of the second element 210 of the assembled frame arrangement 200, and the second cavity 316 corresponds to removed third element 220, or of an internal cavity of the third element 220 for embodiments in which the third element 220 is shaped as a canister. According to at least one example embodiment, the at least two cavities 314, 316 are partitioned from each other by at least a portion the inner metal based member 306 such that a predetermined pattern of the inner metal based member 306 is formed inside of the outer metal based border 304. The predetermined pattern of the inner metal based member 306 may typically correspond to the predetermined pattern of the intermediate space 230 of the assembled frame arrangement 200 of FIG. 2 or FIG. 3. More specifically, the predetermined pattern of the inner metal based member 306 may be defined by the second element 210 and the third element 220, and their arrangement in the interior volume 208 of the assembled frame arrangement 200 for forming the intermediate space 230 in the predetermined pattern. As mentioned previously, the third element 220 may have been removed subsequently to the hot pressing process in order to form the second cavity 316.

FIGS. 5a, 5b, 5c and 5d show different embodiments of metal based frames 500, 600, 700, 800 formed by a hot pressing process of an assembled frame arrangement with corresponding structures as the assembled frame arrangement 200 in FIG. 2 and FIG. 3, but where certain portions or elements have been added or have been removed, or simply where a certain element has been re-shaped to correspond to a desired shape of the metal based frame.

Figure 5A:
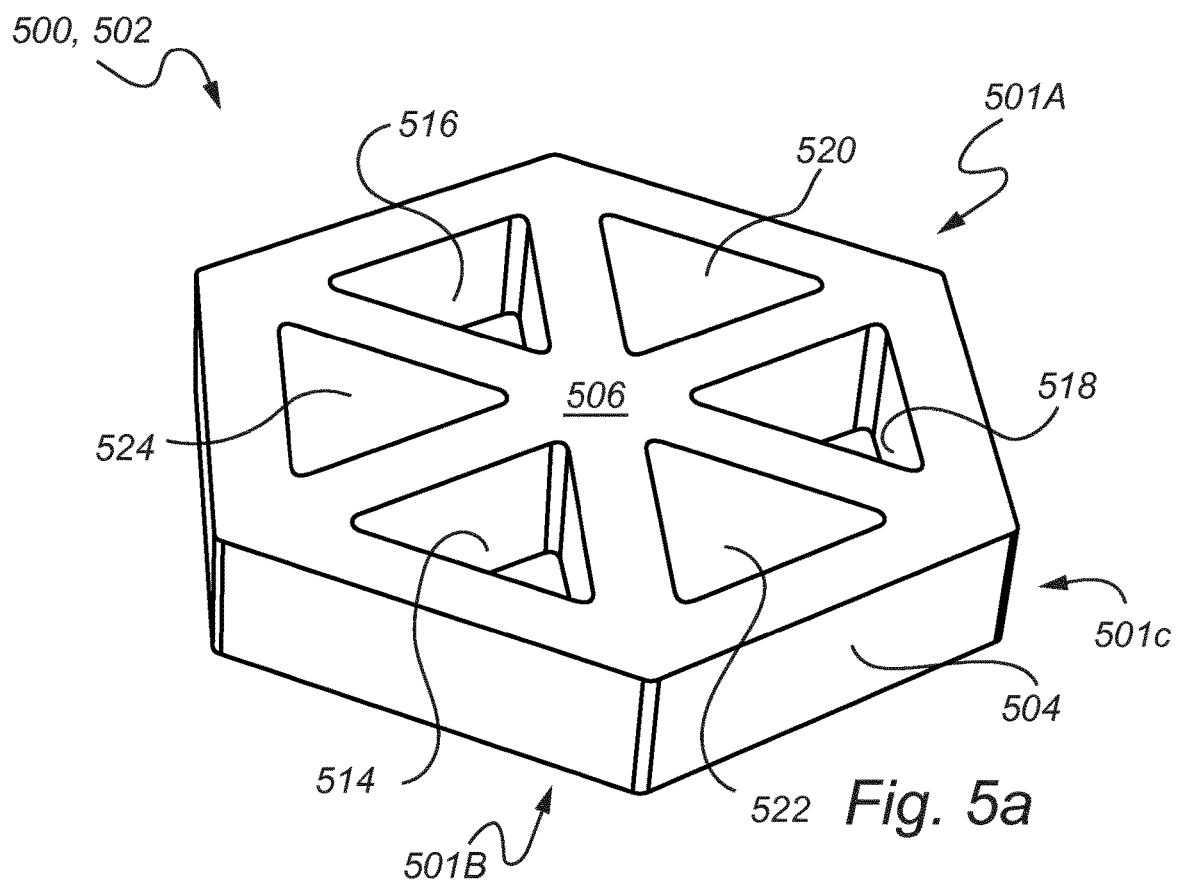
FIGS. 5a-5d show different embodiments of metal based frames in accordance with at least some example embodiments of the invention.

In FIG. 5a, the metal based frame 500 comprises a first side 501A corresponding to the first side 201A of the assembled frame arrangement 200, a second side 501B arranged opposite to the first side 501A, the second side 501B of the metal based frame 500 corresponding to the second side 201B of the assembled frame arrangement 200. Furthermore, the metal based frame 501 comprises a lateral side 501C extending from the first side 501A to the second side 501B. Similar to FIG. 4, the metal based frame 500 of FIG. 5a comprises a frame arrangement 502 having an outer metal based border 504 defining at least the lateral side 501C of the metal based frame 500, and an inner metal based member 506 separating at least two cavities, in FIG. 5a separating three cavities 514, 516, 518, forming at least a part of the frame arrangement 502. Moreover, at least a portion of the inner metal based member 506 comprises, or is made by, a plurality of pieces of a wrought material which have been metallurgically bonded to each other during a hot pressing process.

Furthermore, in FIG. 5a, the three cavities 514, 516, 518 typically correspond to respective internal cavities of elements used as inner elements, e.g. inner canisters prior to the hot pressing process (as e.g. the first element 210 of the assembled frame arrangement 200 in FIG. 2 and FIG. 3, which are not described in detail here again). Separating the three cavities 514, 516, 518, in a circumferential direction of the metal based frame 500, are except for portions of the inner metal based member 506, also three solid blocks 520, 522, 524, wherein each solid block 520, 522, 524 is arranged between two of the three cavities 514, 516, 518. The three solid blocks 522, 524, 526 typically corresponding to respective elements used as inner elements, e.g. inner blocks prior to the hot pressing process (as e.g. the second element 220 of the assembled frame arrangement 200 in FIG. 2 and FIG. 3, which are not described in detail here again). Moreover, the shape of the outer metal based border 504 may e.g. be defined by a corresponding outer element, e.g. an outer canister prior to the hot pressing process (as e.g. the first element 202 of the assembled frame arrangement 200 in FIG. 2 and FIG. 3, which are not described here again). Also, a predetermined pattern of the inner metal based member 506 typically correspond to a predetermined pattern of an intermediate space prior to the hot pressing process (in principle the same as the intermediate space 230 of the assembled frame arrangement 200 of FIG. 2 or FIG. 3).

Figure 5B:
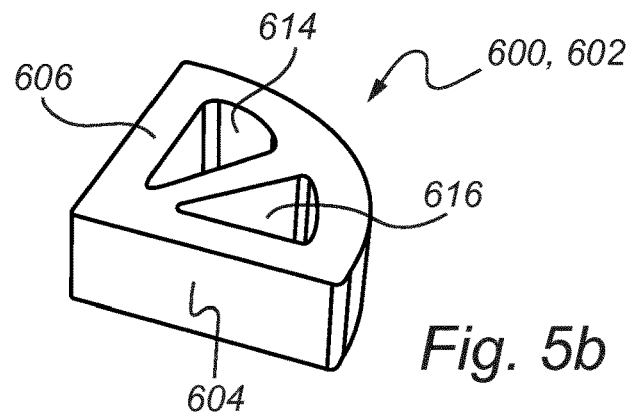
Figure 5C:
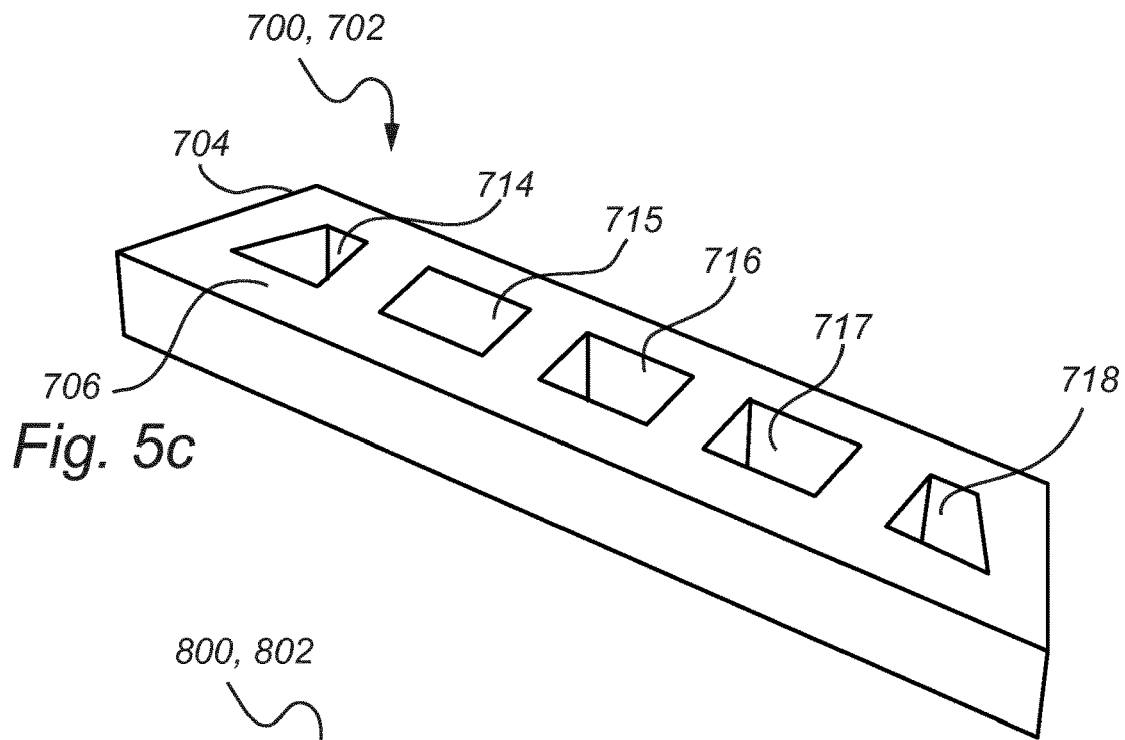
Figure 5D:
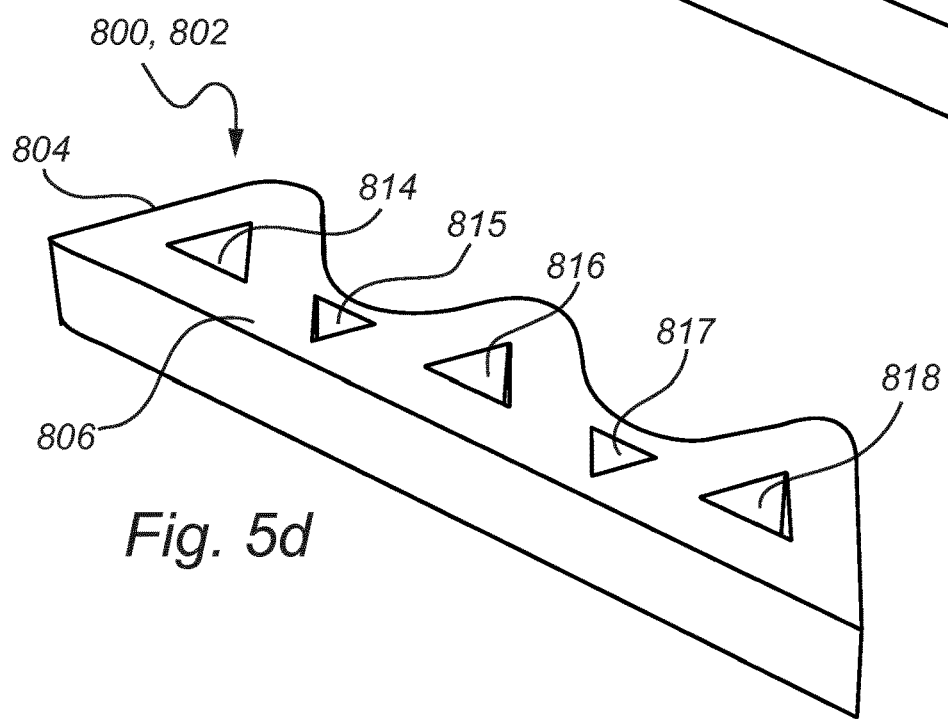

FIG. 5b, FIG. 5c and FIG. 5d show a respective perspective view of different metal based frame 600, 700, 800. In general, each one of the metal based frames 600, 700, 800 is formed from an assembled frame arrangement with corresponding structures as the assembled frame arrangement 200 in FIG. 2 and FIG. 3, but in FIG. 5b, the metal based frame 600 has a cross section formed as a circular segment with corresponding frame arrangement 602 having an outer metal based border 604 and an inner metal based member 606 separating at least two cavities 614, 616. In FIG. 5c, the metal based frame 700 has a cross section formed as a triangular segment with corresponding frame arrangement 702 having an outer metal based border 704 and an inner metal based member 706 separating at least five cavities 714-718. In FIG. 5d, the metal based frame 800 has a corresponding frame arrangement 802 with an outer metal based border 804 and an inner metal based member 806 separating at least five cavities 814-818 as the metal based frame 700 of FIG. 5c, but where the metal based border 804 at one of its sides are wave-shaped.

Figure 6:
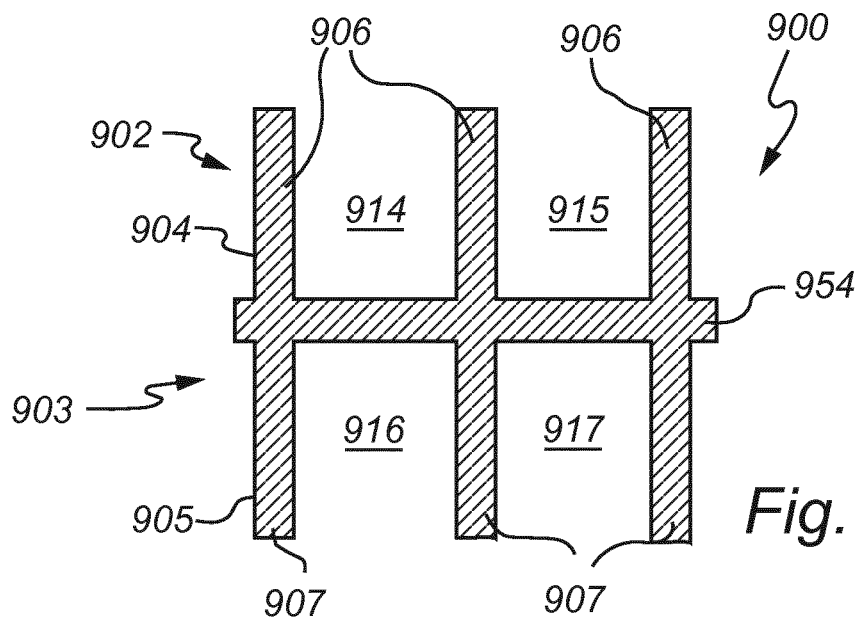
FIG. 6 shows a schematic, cross-sectional view of a metal based frame in accordance with at least one example embodiment of the invention.

FIG. 6 shows a cross section of a metal based frame 900 according to at least one example embodiment of the inventive concept. The metal based frame 900 is formed by a hot pressing process of an assembled frame arrangement with corresponding structures as the assembled frame arrangement 200 in FIG. 2 and FIG. 3, but where a base plate 954 separate two frame arrangements 902, 903, each frame arrangement 902, 903 comprises a respective outer metal based border 904, 905 and a respective inner metal based member 906, 907 separating at least two respective pair of cavities 914, 915, 916, 917.

Figure 7:
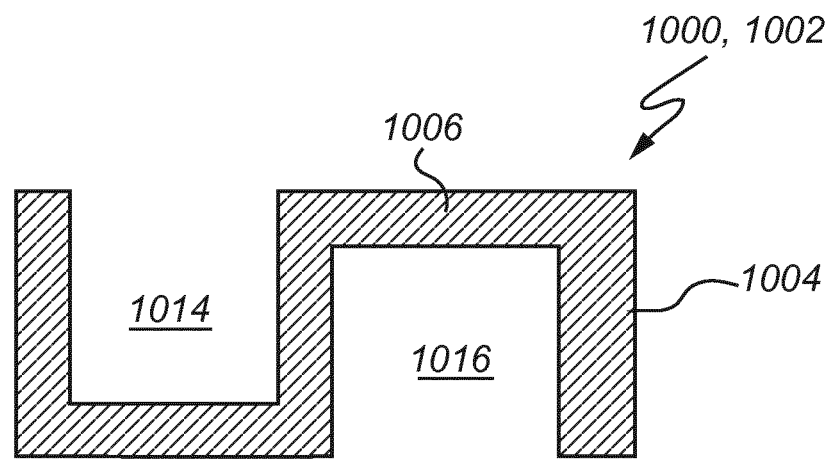
FIG. 7 shows a schematic, cross-sectional view of a metal based frame in accordance with at least one example embodiment of the invention.

FIG. 7 shows a cross section of a metal based frame 1000 according to at least one example embodiment of the inventive concept. The metal based frame 100 is formed by a hot pressing process of an assembled frame arrangement with corresponding structures as the assembled frame arrangement 200 in FIG. 2 and FIG. 3, as e.g. the metal based frame 900 of FIG. 6, i.e. with a corresponding frame arrangement 1002 having an outer metal based border 1004 and an inner metal based member 1006 separating at least two cavities 1014, 1016.

Hence, for all the metal based frames 500-1000, at least a portion of the respective inner metal based member 506, 606, 706, 806, 906, 907, 1006 comprises, or is made by, a plurality of pieces of a wrought material which have been metallurgically bonded to each other during a hot pressing process (e.g. a HIPping process), i.e. the process of a hot pressing for a predetermined time at a predetermined pressure and a predetermined temperature).

Figure 8:
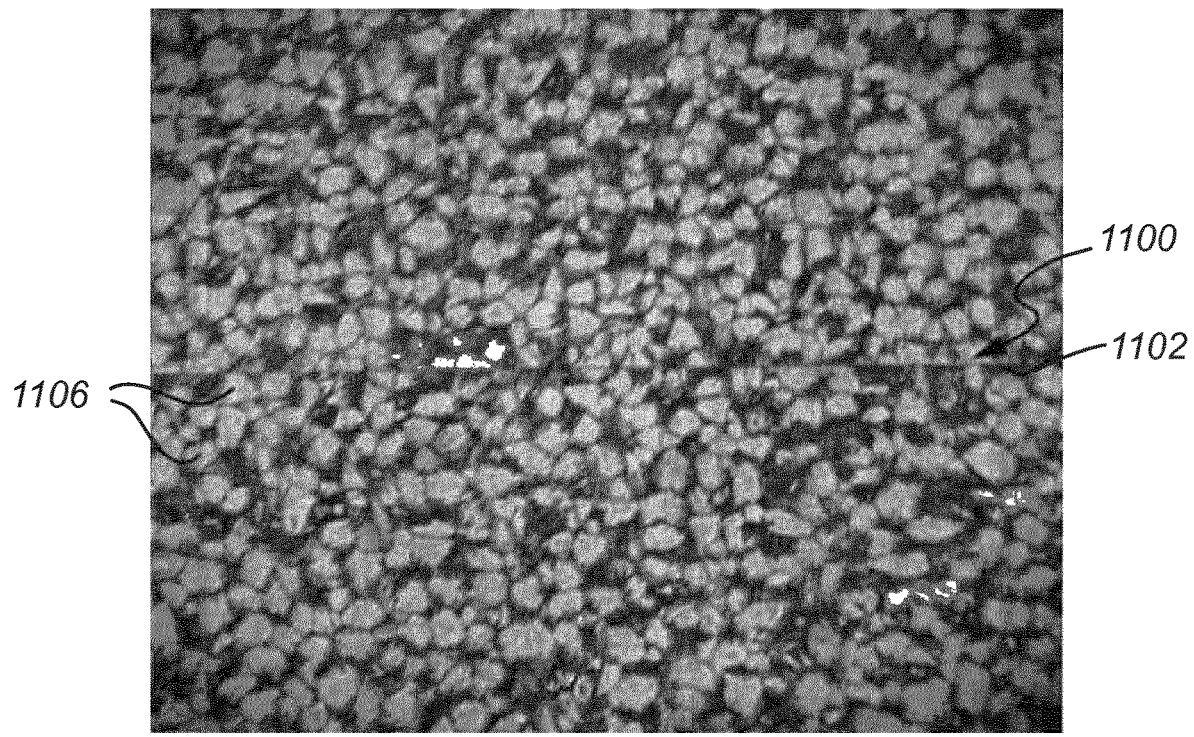
FIG. 8 shows a micrograph of a trace in a metal based frame in accordance with at least one example embodiment of the invention.

FIG. 8 shows a micrograph of a trace 1100, e.g. a metallurgical detectable trace, of the interface between two different pieces in the plurality of pieces of a wrought material 250, which trace is visible in the metal based compound after it is manufactured. In the micrograph, the line 1102, along which line a crystallographic mismatch of metal grains 1106 is clearly visible. Thus, the traces are formed by crystallographic mismatch at interfaces between different pieces in the plurality of pieces of a wrought material.

Figure 9A:
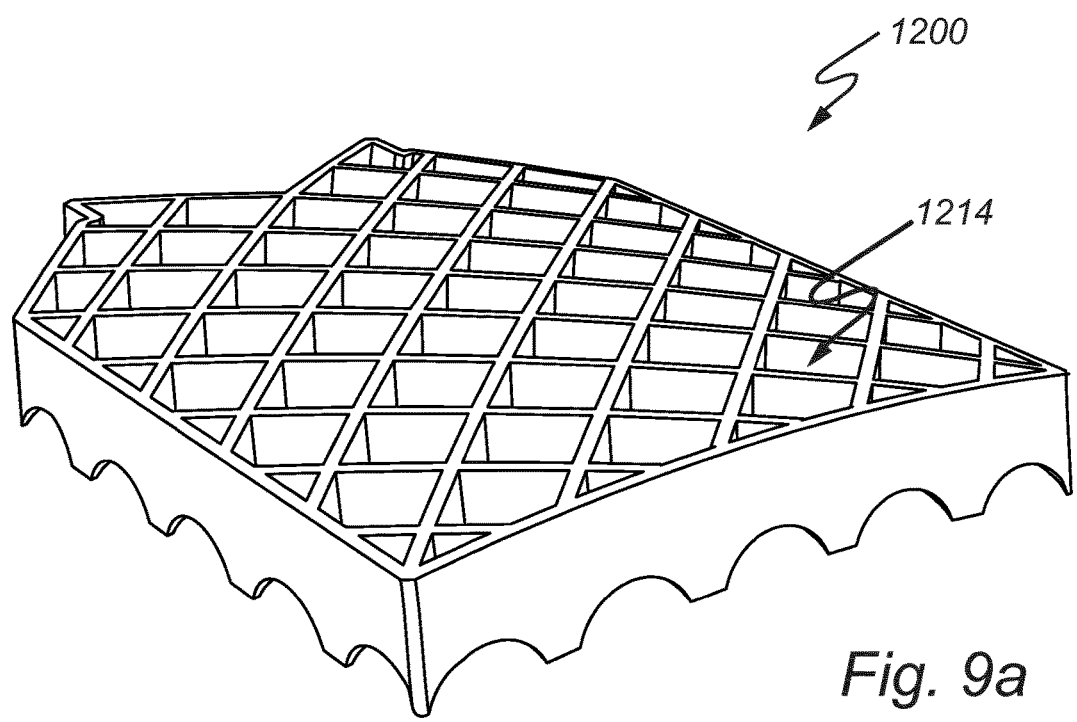
FIG. 9a shows a schematic perspective view of a metal based frame in accordance with at least one example embodiment of the invention.

FIG. 9a shows a perspective top view of an embodiment of a metal based frame 1200 formed by a hot pressing process of an assembled frame arrangement with corresponding structures as the assembled frame arrangement 200 in FIG. 2 and FIG. 3. The embodiment corresponds to the embodiment shown in FIG. 4, but herein, the cavities 1214 are through holes extending through the metal frame. The frame 1200 is shown with a plurality of through holes 1214. The frame 1200 has a curved shape. The ratio, by volume, of metal:cavity in the frame can be calculated in a manner akin to as described in relation to FIG. 4. The metal volume may be calculated by calculating or measuring the volume a solid component having the same outer components would have and subtracting the total volume of the cavities. In this example however, it should be noted that the frame is curved and may not have a uniform height.

Figure 9B:
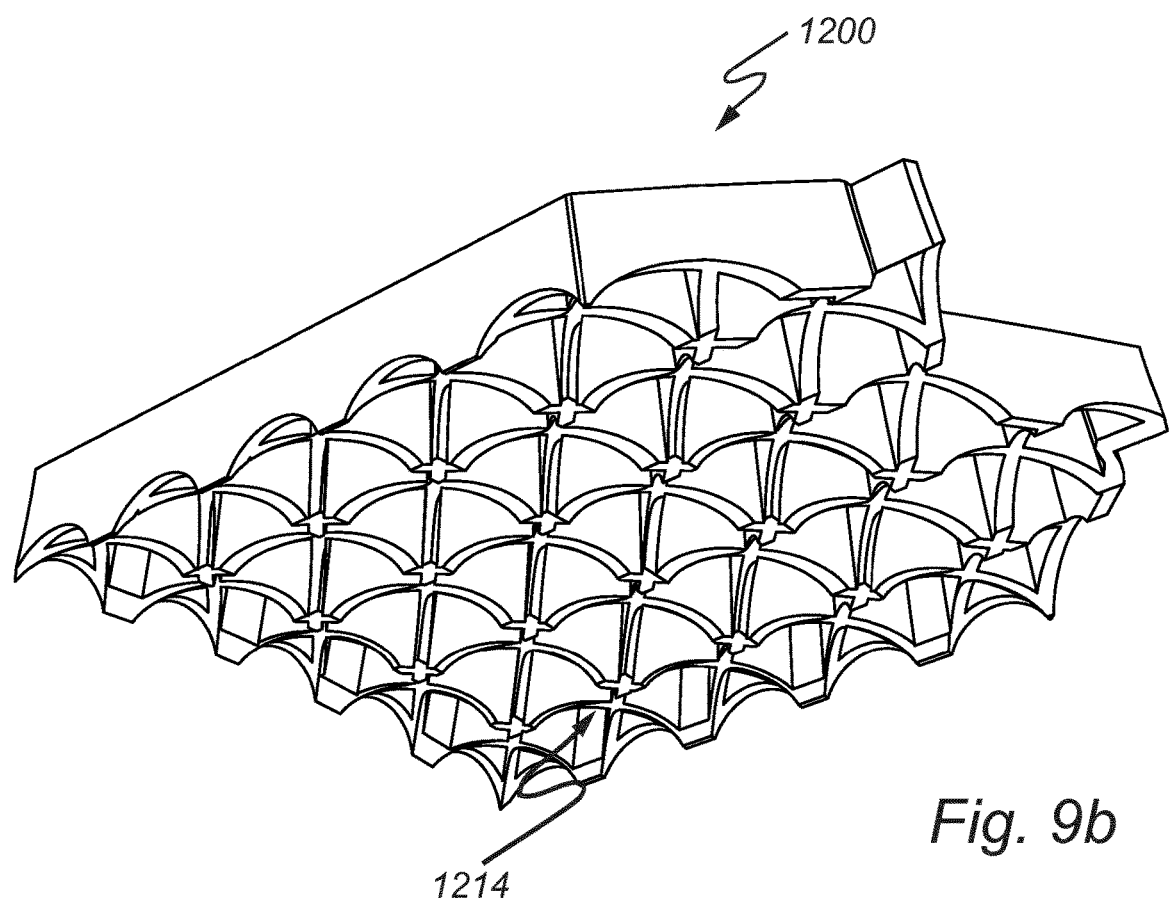
FIG. 9b shows a schematic perspective view of a metal based frame in accordance with at least one example embodiment of the invention.

FIG. 9b shows the frame 1200 of FIG. 9a in a view perspective view showing the underside of the frame. The frame comprises cavities 1214 in the form of through-holes.

The invention claimed is:

1. A metal based frame comprising:
    a first side, a second side arranged opposite to said first side, and a lateral side extending from said first side to said second side;
    a frame arrangement having an outer metal based border defined by at least the lateral side of said metal based frame, and an inner metal based member separating at least two cavities forming at least a part of said frame arrangement;
    wherein at least a portion of said inner metal based member has been produced by a plurality of pieces of a wrought material which have been metallurgically bonded to each other during the process of a hot pressing, such as e.g. hot isostatic pressing, for a predetermined time at a predetermined pressure and a predetermined temperature,
    wherein the ratio, by volume, of cavities:metal in the frame is at least 3,
    wherein said metal based frame comprises metallurgical detectable traces of said plurality of pieces of wrought material, wherein said metallurgical detectable traces are formed by crystallographic mismatch at interfaces between different pieces in said plurality of pieces of a wrought material; and
    wherein each piece in the plurality of pieces of wrought material is larger than a powder particle.

2. The metal based frame according to claim 1, wherein the shape of said outer metal based border is defined by a first element used as an outer element during the process of a hot pressing for a predetermined time at a predetermined pressure and a predetermined temperature.

3. The metal based frame according to claim 1, wherein said at least two cavities are partitioned from each other by said inner metal based member such that a predetermined pattern of said inner metal based member is formed inside of said outer metal based border.

4. The metal based frame according to claim 1, wherein said predetermined pattern is defined by a second element having a second element outer wall, and a third element having a third element outer wall, wherein said first and second elements have been arranged at least partly in an interior volume at least partly defined by a first element inner enveloping wall of said first element, such that an intermediate space has been formed between said first element inner enveloping wall and said second element outer wall and said third element outer wall in said predetermined pattern; and wherein said plurality of pieces of a wrought material which have been metallurgically bonded to each other during the process of a hot pressing for a predetermined time at a predetermined pressure and a predetermined temperature, has been arranged in said intermediate space with said predetermined pattern.

5. The metal based frame according to claim 1, wherein at least one of the cavities is a through hole.

6. The metal based frame according to claim 1, wherein the ratio, by volume, of cavities:metal in the frame is at least 5.

7. The metal based frame according to claim 1, wherein the hot pressing comprises hot isostatic pressing.

8. The metal based frame according to claim 1, wherein each piece in the plurality of pieces of wrought material is at least 1 mm in one of its extensions.

* * * * *